US010076984B2

(12) United States Patent
Sekino et al.

(10) Patent No.: US 10,076,984 B2
(45) Date of Patent: Sep. 18, 2018

(54) TRIM COVER AND VEHICLE SEAT

(71) Applicant: TACHI-S CO., LTD., Tokyo (JP)

(72) Inventors: Hiroshi Sekino, Tokyo (JP); Yukihito Kobayashi, Tokyo (JP); Norio Endou, Tokyo (JP); Takahiro Kikuchi, Tokyo (JP)

(73) Assignee: TACHI-S CO., LTD., Tokyo (JP)

( * ) Notice: Subject to any disclaimer, the term of this patent is extended or adjusted under 35 U.S.C. 154(b) by 0 days.

(21) Appl. No.: 15/498,285

(22) Filed: Apr. 26, 2017

(65) Prior Publication Data

US 2017/0305318 A1 Oct. 26, 2017

(30) Foreign Application Priority Data

Apr. 26, 2016 (JP) .................................. 2016-088334
Apr. 21, 2017 (JP) .................................. 2017-084713

(51) Int. Cl.
*A47C 7/02* (2006.01)
*B60N 2/58* (2006.01)

(52) U.S. Cl.
CPC ............ *B60N 2/5891* (2013.01); *B60N 2/58* (2013.01); *H05K 999/99* (2013.01)

(58) Field of Classification Search
CPC ...... B60N 2/5883; B60N 2/70; B60N 2/5816; B60N 2/58; B60N 2/686
USPC ..................................................... 297/452.38
See application file for complete search history.

(56) References Cited

U.S. PATENT DOCUMENTS

| 3,649,974 | A | * | 3/1972 | Baruth | A47C 7/18 297/452.59 |
| 5,873,318 | A | * | 2/1999 | Bohlinger | D05B 23/00 112/302 |
| 5,893,579 | A | * | 4/1999 | Kimura | B60N 2/5825 280/728.3 |
| 2005/0160956 | A1 | * | 7/2005 | Guy | B60N 2/5883 112/475.08 |
| 2007/0210043 | A1 | * | 9/2007 | Mastin | B23K 26/0084 219/121.69 |
| 2012/0031317 | A1 | * | 2/2012 | Lafferty | B60N 2/5883 112/400 |
| 2014/0004289 | A1 | * | 1/2014 | Piccin | B27D 1/10 428/57 |
| 2016/0088951 | A1 | * | 3/2016 | McGuinness | A47C 27/001 5/35 |
| 2016/0304014 | A1 | * | 10/2016 | Lelievre | B29C 59/002 |
| 2016/0368405 | A1 | * | 12/2016 | Ishii | B60N 2/5891 |
| 2017/0028937 | A1 | * | 2/2017 | Sekino | B60N 2/70 |
| 2017/0114485 | A1 | * | 4/2017 | Yoshizawa | D05B 3/00 |
| 2017/0151897 | A1 | * | 6/2017 | Nishikido | B60N 2/58 |

FOREIGN PATENT DOCUMENTS

JP 2013-162957 A 8/2013

* cited by examiner

*Primary Examiner* — Mark R Wendell
(74) *Attorney, Agent, or Firm* — Seed IP Law Group LLP

(57) ABSTRACT

A trim cover includes a plurality of surface materials joined each other, the plurality of surface materials including two pieces of surface materials, each of which is formed with a plurality of elements that form an iterative pattern repeated along a joining direction of the two pieces of the surface materials, wherein the plurality of elements line up by a same pattern in an extending direction of sewing regions of the two pieces of surface materials, and extend parallel to the joining direction, at least at the sewing regions.

6 Claims, 7 Drawing Sheets

TRIM COVER AND VEHICLE SEAT

CROSS-REFERENCE TO RELATED APPLICATION(S)

This application is based upon and claims the benefit of priority from Japanese Patent Application No. 2016-088334, filed on Apr. 26, 2016 and Japanese Patent Application No. 2017-084713, filed on Apr. 21, 2017, the entire contents of which are incorporated herein by reference.

BACKGROUND

1. Field of the Invention

The present invention relates to a trim cover and a vehicle seat.

2. Description of the Related Art

A vehicle seat typically includes a cushioning pad and a trim cover that covers the cushioning pad, and the trim cover is made by joining a plurality of surface materials. From a view of improving design of the seat, a plurality of stitches may be formed at the surface materials as a pattern (for example, refer to JP-A-2013-162957).

When two pieces of surface materials which are joined are formed with a plurality of stitches respectively which extend in the joining direction of the two pieces of surface materials, typically, the plurality of stitches are formed by the same pattern, and the two pieces of surface materials are joined so that the stitches are continuous across the seam of the two pieces of surface materials.

Due to mutual misalignment of the two pieces of surface materials and misalignment of the seam when the two pieces of surface materials are joined, a plurality of stitches of the two pieces of surface materials may become discontinuous at the seam of the two pieces of surface materials. Particularly, when the stitches extend obliquely with respect to the joining direction of the two pieces of surface materials, discontinuity of the stitches is easy to occur at the seam of the two pieces of surface materials. When the discontinuity of the stitches occurs at the seam of the two pieces of surface materials, the design of the seat may be spoiled.

SUMMARY

The present invention is made in view of the above circumstances, and the object of the present invention is to prevent a pattern from being discontinuous at the seam of two pieces of surface materials which are joined, and improve the design of a trim cover and a vehicle seat.

According to an aspect of the present invention, there is provided a trim cover including a plurality of surface materials joined each other, the plurality of surface materials including two pieces of surface materials, each of which is formed with a plurality of elements that form an iterative pattern repeated along a joining direction of the two pieces of the surface materials, wherein the plurality of elements line up by a same pattern in an extending direction of sewing regions of the two pieces of surface materials, and extend parallel to the joining direction, at least at the sewing regions.

According to another aspect of the present invention, there is provided a vehicle seat including: a trim cover including a plurality of surface materials, joined each other, the plurality of surface materials including two pieces of surface materials, each of which is formed with a plurality of elements that form an iterative pattern repeated along a joining direction of the two pieces of the surface materials; and a cushioning pad covered by the trim cover, wherein the plurality of elements line up by a same pattern in an extending direction of sewing regions of the two pieces of surface materials, and extend parallel to the joining direction, at least at the sewing regions.

According to the present invention, the pattern at the seam of two pieces of surface materials which are joined are prevented from becoming discontinuous, and design of a trim cover and a vehicle seat can be improved.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Figure 1:
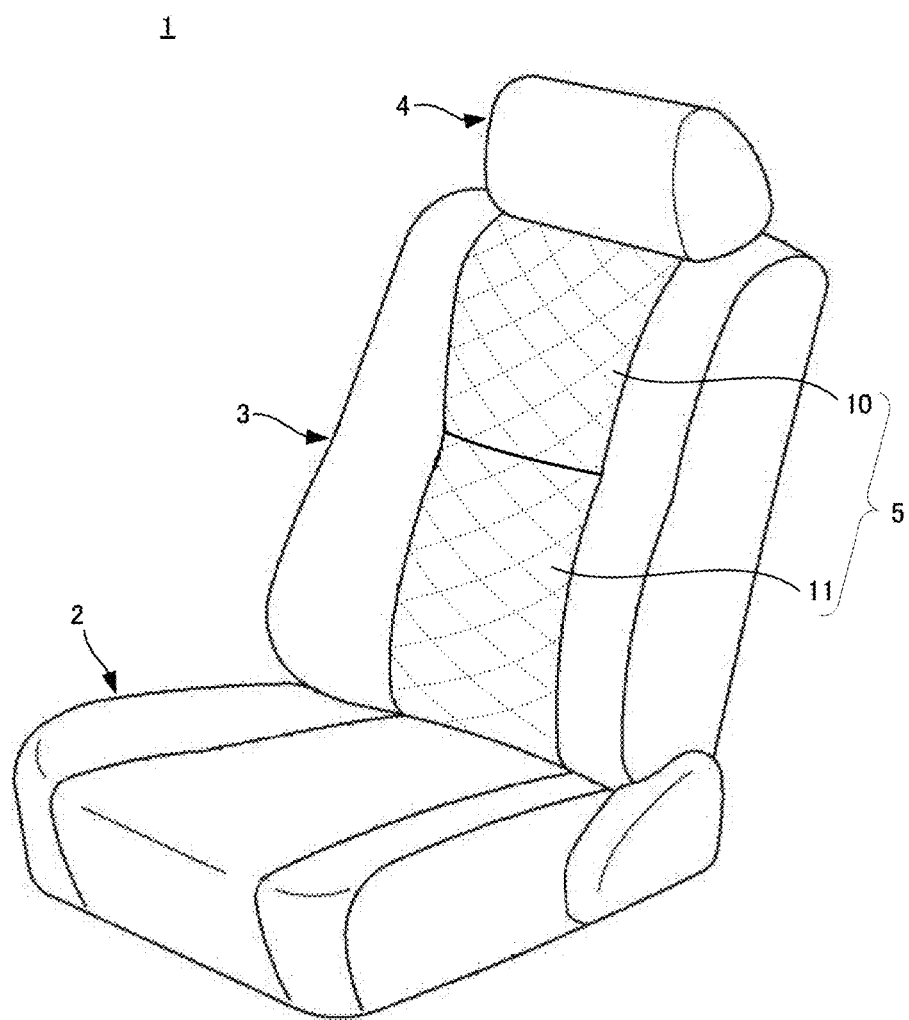
FIG. 1 is a perspective view of a vehicle seat to describe an embodiment of the present invention.

FIG. 1 shows an example of the vehicle seat to describe an embodiment of the present invention.

A vehicle seat 1 shown in FIG. 1 includes a seat cushion 2 which forms a bearing surface portion, a seat pack 3 which forms a back rest portion, and a head rest 4 which supports the head of a passenger who is seated on the seat. Each of the seat cushion 2, the seat pack 3 and the head rest 4 has a cushioning pad made of foam material such as urethane foam, and a frame which supports the cushioning pad.

The cushioning pad of the seat cushion 2 and the cushioning pad of the seat pack 3 are covered integrally with a trim cover 5, and the cushioning pad of the head rest 4 is also covered with the trim cover 5 or another trim cover.

The cushioning pad of the seat cushion 2 and the cushioning pad of the seat pack 3 may be covered by individual trim covers, respectively, and when the head rest 4 is a fixed head rest and is formed integrally with the seat pack 3, the cushioning pad of the head rest 4 may be covered integrallly with the cushioning pad of the seat pack 3 by one trim cover, or may be covered integrallly with the cushioning pad of the seat cushion 2 and the cushioning pad of the seat pack 3 by one trim cover.

The trim cover 5 is formed by joining a plurality of surface materials, and, for example, leather (natural leather, synthetic leather) or cloth (textile, knitting, nonwoven fabric) are used as the surface materials. The surface material may have a single-layered structure of leather or cloth, and may have a multilayer structure in which a wadding (for example, resin foam such as elastically deformable flexible polyurethane foam) is laminated on leather or cloth as an outer material. The trim cover 5 may be formed of one kind of surface material, and may be formed of a plurality of different surface materials at different positions.

Among the plurality of surface materials that forms the trim cover 5, two pieces of joined surface materials 10, 11 are surface materials which cover the central portion in the widthwise direction of the front surface of the seat pack 3, and an iterative pattern, repeated along the joining direction of the surface materials 10, 11 (direction in which the surface materials 10, 11 are aligned), is formed at the surface materials 10, 11, respectively.

Figure 2:
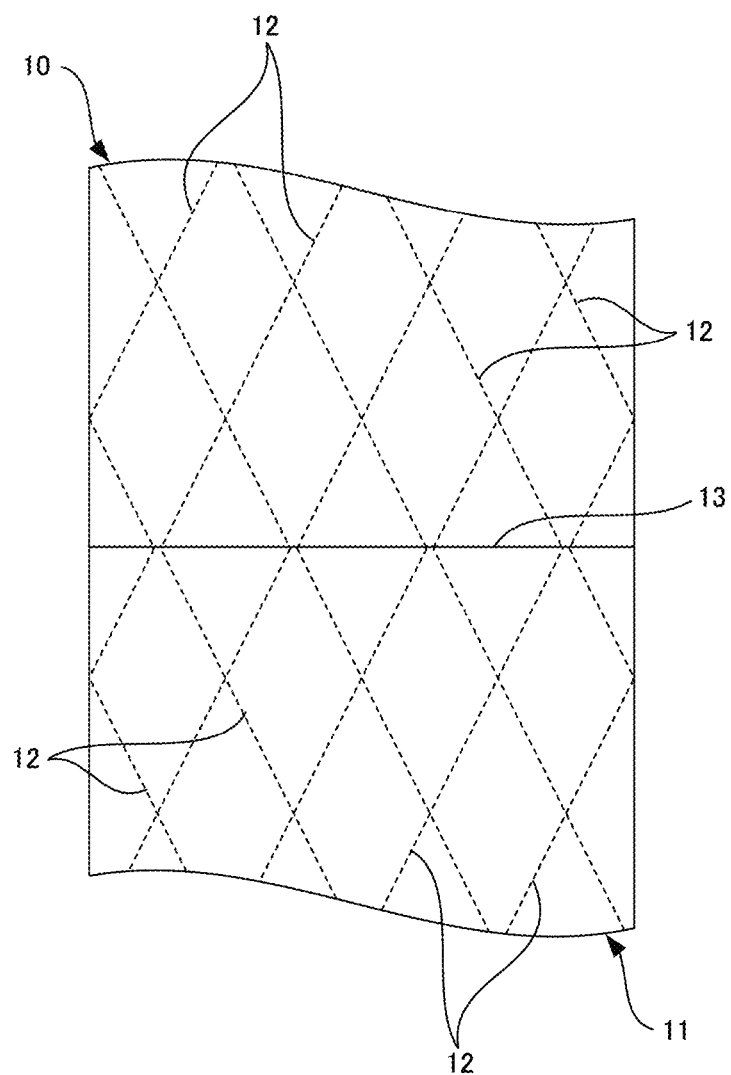
FIG. 2 is a top view of two pieces of joined surface materials of a trim cover of FIG. 1.
Figure 3:
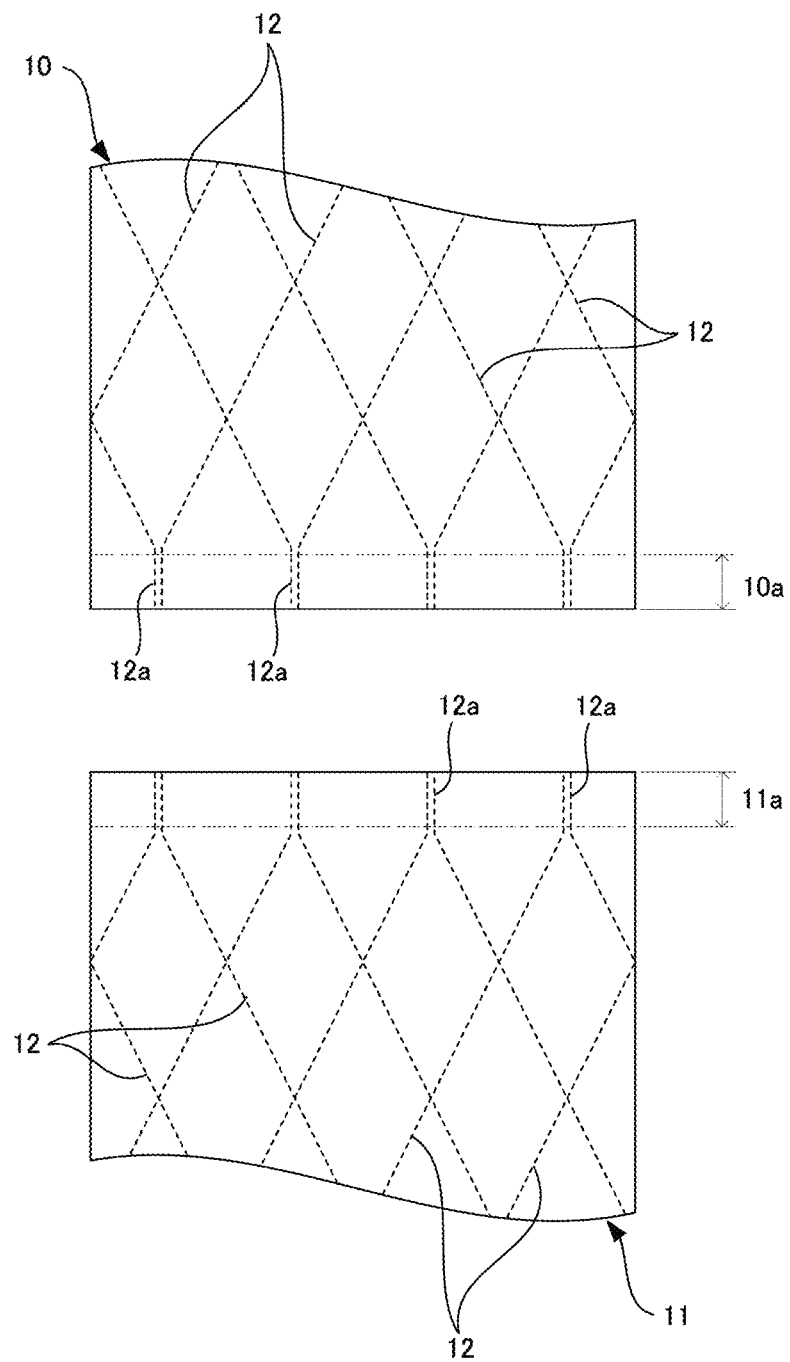
FIG. 3 is a top view which shows that the two pieces of surface materials of FIG. 2 are separated.

FIGS. 2 and 3 show the constitution of the pattern of the surface materials 10, 11.

In the shown example, a plurality of stitches 12 are formed at the surface materials 10, 11, respectively. The plurality of stitches 12 include a group of stitches which extend obliquely toward one side relative to the joining direction and straightly parallel to each other, and a group of stitches which extend obliquely toward the other side relative to the joining direction and straightly parallel to each other. These two stitch groups intersect into a grid-like form to configure an iterative pattern repeated along the joining direction of the surface materials 10, 11. The pattern of the stitches 12 is not limited to the example shown.

The plurality of stitches 12 reach sewing regions 10a, 11a of the joined surface materials 10, 11. Ends 12a of the plurality of stitches 12, in the sewing regions 10a, 11a, line up in the same pattern in the extending direction of the sewing regions 10a, 11a. The surface materials 10, 11 are joined so that the ends 12a of the plurality of stitches 12 are matched and the stitches 12 continue across a seam 13 of the surface materials 10, 11.

As shown in FIG. 3, while the plurality of stitches 12 extend obliquely relative to the joining direction of the surface materials 10, 11 except the ends 12a, the ends 12a, extend straightly parallel to the joining direction of the surface materials 10, 11.

Figure 4:
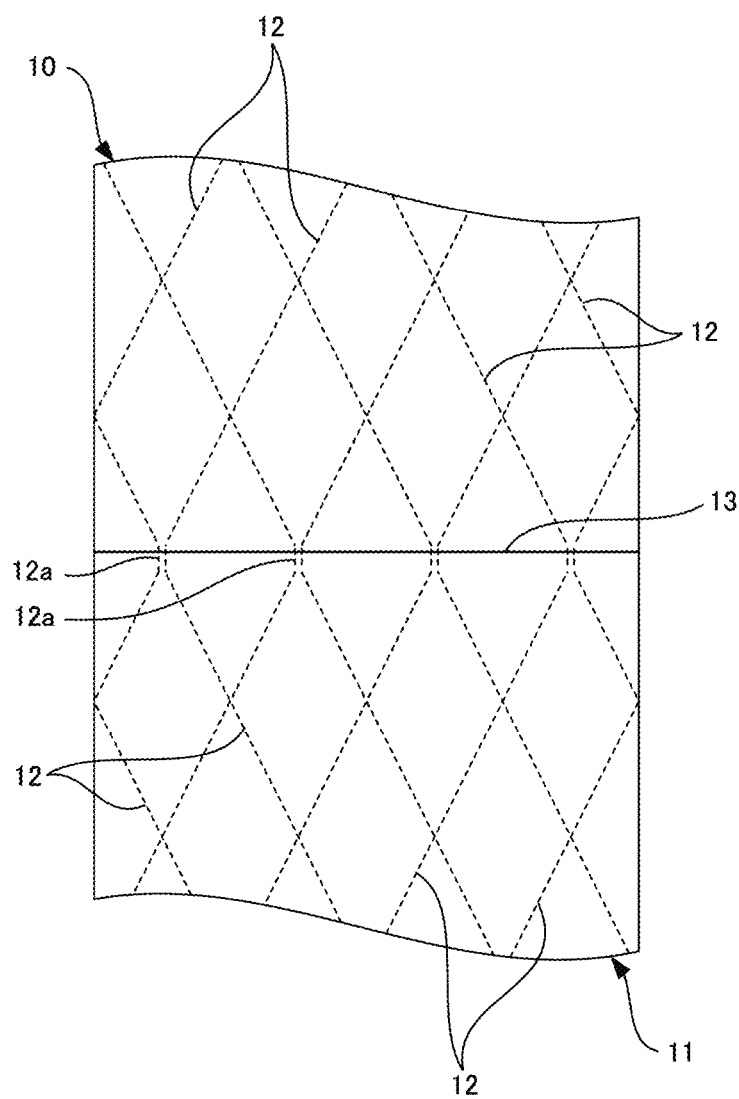
FIG. 4 is a top view of an example in which the two pieces of surface materials of FIG. 2 are mutually misaligned and joined in the joining direction.
Figure 5:
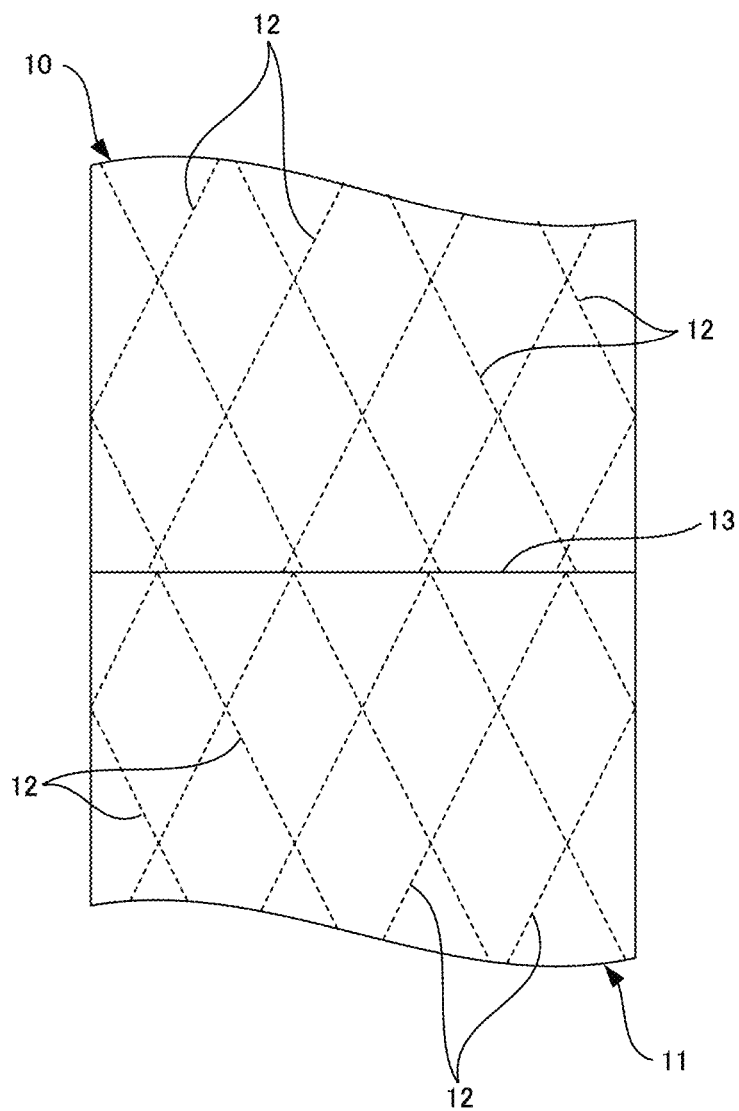
FIG. 5 is a top view of another example in which two pieces of surface materials are mutually misaligned and joined in the joining direction.

FIGS. 4 and 5 show that the surface materials 10, 11 are mutually misaligned in the joining direction and joined.

FIG. 4 shows that the ends 12a of the plurality of stitches 12 of the surface materials 10, 11 extend straightly parallel to the joining direction of the surface materials 10, 11. although a part of the ends 12a appears at the seam 13 of the surface materials 10, 11, continuity of the stitches 12 is kept across the seam 13.

On the other hand, FIG. 5 shows that the plurality of stitches 12 of the surface materials 10, 11 extend obliquely relative to the joining direction of the surface materials 10, 11 until the ends. Due to the mutual misalignment of the surface material 11, 12 in the joining direction, discord of the stitches 12 occurs at the seam 13 of the surface materials 10, 11, and the stitches 12 do not continue on the border of the seam 13.

Although the surface materials 10, 11 are mutually misaligned in the joining direction and joined, the mutual misalignment of the surface materials 10, 11 in the joining direction is equivalent to that the seam that joins the surface materials 10, 11 is misaligned in the joining direction of the surface materials 10, 11. Therefore, even if the seam that joins the surface materials 10, 11 is misaligned, if the ends 12a of the stitches 12 extend straightly parallel to the joining direction of the surface materials 10, 11, the continuity of the stitches 12 is kept.

In this way, the ends 12a of the plurality of stitches 12 of the surface materials 10, 11, at the sewing regions 10a, 11a, line up by the same pattern in the extending direction of the sewing regions 10a, 11a, and extend straightly parallel to the joining direction of the surface materials 10, 11. Thereby, even if the surface materials 10, 11 are mutually misaligned or the seam is misaligned, continuity of the stitches 12 can be kept, and design of the trim cover 5 and the vehicle seat 1 can be improved.

Figure 6:
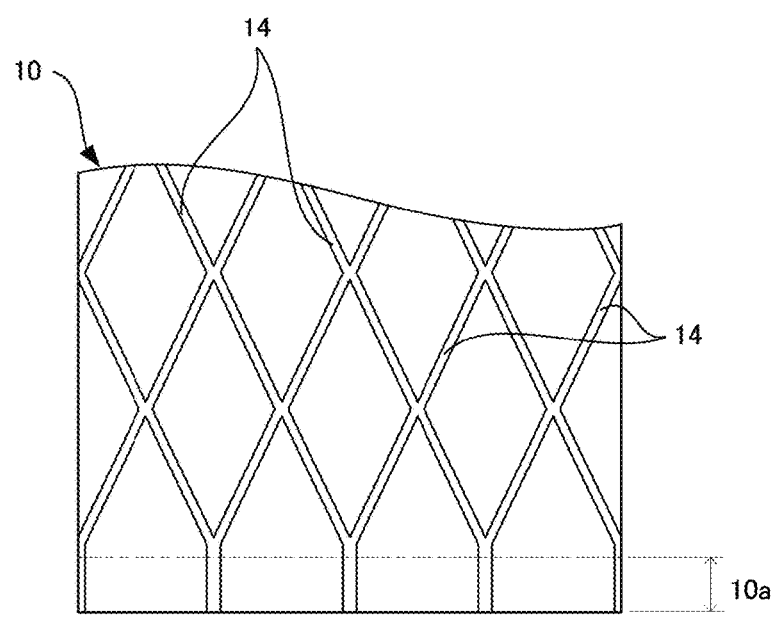
FIG. 6 is a top view of two pieces of joined surface materials of a trim cover of another embodiment of the present invention.
Figure 6:
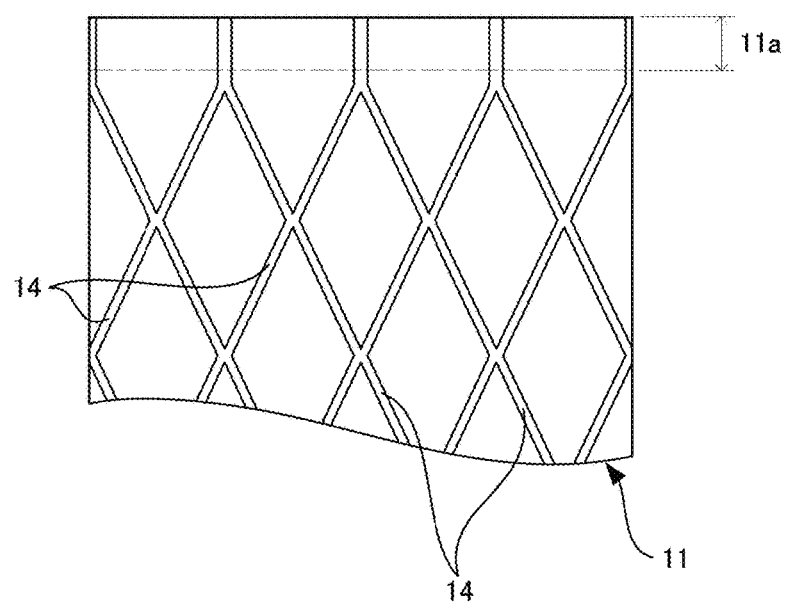
Figure 7:
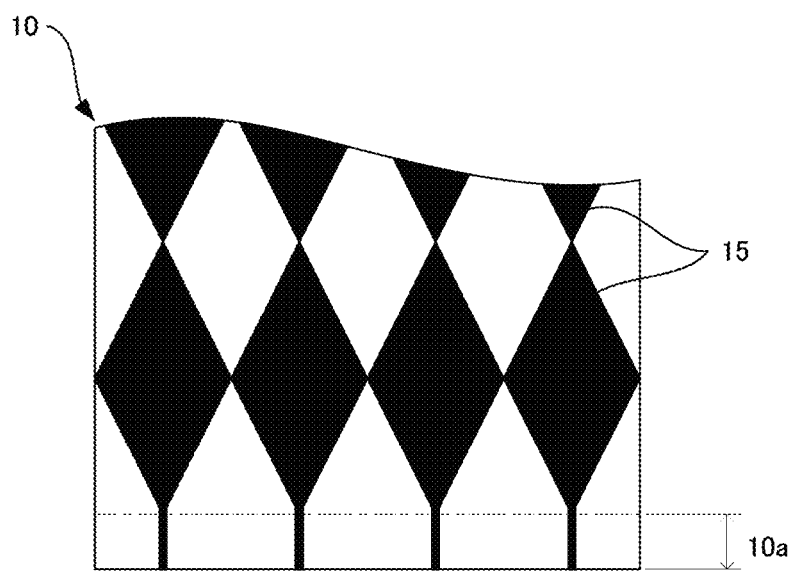
FIG. 7 is a top view of two pieces of joined surface materials of a trim cover of still another embodiment of the present invention.
Figure 7:
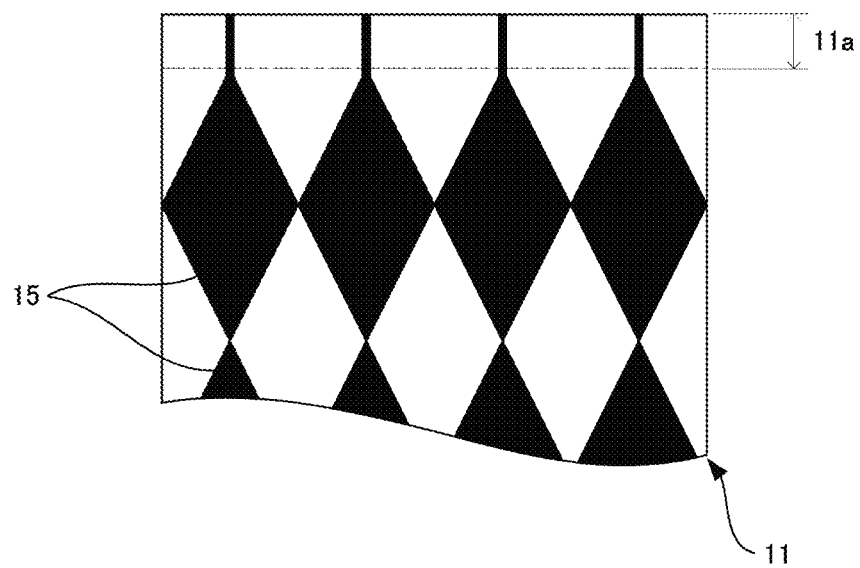

The above are corresponding to the configuration that the plurality of stitches 12 configure the pattern formed at the surface materials 10, 11, respectively. However, the elements, forming the pattern, may be embossed portions 14 as shown in FIG. 6, and may be printed portions 15 as shown in FIG. 7. If the elements (the embossed portions 14 or the printed portions 15) line up by a same pattern in the extending direction of sewing regions 10a, 11a, and extend parallel to the joining direction of the surface materials 10, 11, at least at the sewing regions 10a, 11a, the surface materials 10, 11 are joined so that the elements are continuous across the seam of the surface materials. 10, 11, and the continuity of the stitches 12 is kept.

What is claimed is:

1. A trim cover comprising:
    a plurality of surface materials joined to each other, the plurality of surface materials including two pieces of surface materials, each of which is formed with a plurality of elements that form an iterative pattern repeated along a joining direction of the two pieces of the surface materials, wherein
    the plurality of elements of one piece of the surface material line up with the plurality of elements of the other piece of surface material in a same pattern in an extending direction of sewing regions of the two pieces of surface materials,
    the plurality of elements extend parallel to the joining direction, at least at the sewing regions, and
    the joining direction is perpendicular to the extending direction.
2. The trim cover according to claim 1, wherein the elements extend obliquely relative to the joining direction except in the sewing regions.
3. The trim cover according to claim 1, wherein the elements are stitches.
4. The trim cover according to claim 1, wherein the elements are embossed portions.
5. The trim cover according to claim 1, wherein the elements are printed portions.
6. A vehicle seat comprising
    a trim cover including a plurality of surface materials, joined to each other, the plurality of surface materials including two pieces of surface materials, each of which is formed with a plurality of elements that form an iterative pattern repeated along a joining direction of the two pieces of the surface materials; and
    a cushioning pad covered by the trim cover, wherein
    the plurality of elements of one piece of the surface material line up with the plurality of elements of the other piece of surface material in a same pattern in an extending direction of sewing regions of the two pieces of surface materials,
    the plurality of elements extend parallel to the joining direction, at least at the sewing regions, and the joining direction is perpendicular to the extending direction.

* * * * *